(12) United States Patent
Amutham (10) Patent No.: US 8,476,794 B2
(45) Date of Patent: Jul. 2, 2013

(54) WHEEL MOTOR WITH ROTATING OUTER ROTOR

(75) Inventor: Velayutham Kadal Amutham, Chennai (IN)

(73) Assignee: Empire Technology Development LLC, Wilmington, DE (US)

( * ) Notice: Subject to any disclaimer, the term of this patent is extended or adjusted under 35 U.S.C. 154(b) by 413 days.

(21) Appl. No.: 12/551,065

(22) Filed: Aug. 31, 2009

(65) Prior Publication Data

US 2010/0301712 A1 Dec. 2, 2010

(30) Foreign Application Priority Data

May 27, 2009 (IN) .................. 1226/CHE/2009

(51) Int. Cl.
*H02K 11/00* (2006.01)
*H02K 23/66* (2006.01)

(52) U.S. Cl.
USPC ... 310/68 B; 310/67 R; 310/90; 310/216.021; 310/216.022; 318/400.37

(58) Field of Classification Search
CPC .. H02K 11/0015; H02K 11/0021; H02K 29/08
USPC .......... 310/90, 67 R, 68 B, 216.021, 216.022; 318/400.37
See application file for complete search history.

(56) References Cited

U.S. PATENT DOCUMENTS

| | | | |
|---|---|---|---|
| 3,274,471 A * | 9/1966 | Moczala | 318/400.37 |
| 4,249,116 A * | 2/1981 | Frosch et al. | 318/400.27 |
| 4,743,995 A | 5/1988 | Castle et al. | |
| 4,949,023 A * | 8/1990 | Shlien | 318/541 |
| 5,369,324 A * | 11/1994 | Saether | 310/49.16 |
| 5,633,551 A * | 5/1997 | Weh | 310/266 |
| 6,509,666 B1 | 1/2003 | Huang et al. | |
| 6,989,618 B2 * | 1/2006 | Fukuyama et al. | 310/90 |
| 7,046,496 B2 | 5/2006 | Hsin | |
| 7,064,468 B2 * | 6/2006 | Fujinaka | 310/216.114 |
| 7,249,643 B2 | 7/2007 | Etzioni et al. | |

(Continued)

FOREIGN PATENT DOCUMENTS

| | | |
|---|---|---|
| EP | 0579084 | 10/1996 |
| JP | 6171379 | 6/1994 |

(Continued)

OTHER PUBLICATIONS

Machine Translation of JP 06-171379,"Driving Wheel for Traveling Body", Jun. 21, 1994, Sawaguchi et al.*

(Continued)

*Primary Examiner* — John K Kim
(74) *Attorney, Agent, or Firm* — Foley & Lardner LLP (57) ABSTRACT

An in-wheel motor having an inner stationary portion (the stator), and an outer rotating portion (the rotor) that rotates around the stator and drives a wheel directly attached to the rotor. The stator may comprise an inner support structure around which a plurality of magnets having windings are disposed in a circumferential fashion. The rotor circumferentially surrounds the stator, and includes permanent magnets placed at an interval along a surface of the rotor. An intermediate layer between the rotor and the stator is comprised of a bearing that allows movement of the rotor relative to the stator. By attaching a wheel directly to the outer surface of the rotor, a compact and efficient wheel-mounted electrical motor may be provided.

20 Claims, 4 Drawing Sheets

U.S. PATENT DOCUMENTS

| | | | |
|---|---|---|---|
| 7,312,549 B2* | 12/2007 | Rasmussen | 310/168 |
| 7,528,518 B2* | 5/2009 | Maeda et al. | 310/67 R |
| 2003/0193263 A1* | 10/2003 | Maslov et al. | 310/254 |
| 2003/0205946 A1* | 11/2003 | Maslov | 310/254 |
| 2004/0021437 A1* | 2/2004 | Maslov et al. | 318/254 |
| 2004/0099455 A1* | 5/2004 | Nagaya | 180/65.5 |
| 2005/0184689 A1* | 8/2005 | Maslov et al. | 318/254 |
| 2005/0254800 A1 | 11/2005 | Nelson et al. | |
| 2006/0016628 A1* | 1/2006 | Heinen | 180/65.1 |
| 2006/0049712 A1 | 3/2006 | Zepp et al. | |
| 2007/0169972 A1* | 7/2007 | Suzuki et al. | 180/65.5 |
| 2007/0296302 A1 | 12/2007 | Fei et al. | |
| 2008/0070736 A1* | 3/2008 | Yoshino et al. | 475/149 |
| 2008/0308336 A1 | 12/2008 | van Rooij | |
| 2009/0033166 A1 | 2/2009 | Takeuchi et al. | |
| 2010/0301712 A1* | 12/2010 | Amutham | 310/68 B |

FOREIGN PATENT DOCUMENTS

| | | | |
|---|---|---|---|
| JP | 2005333705 | | 12/2005 |
| JP | 2006057732 | * | 3/2006 |
| JP | 2008126733 | | 6/2008 |
| WO | WO02094603 | | 11/2002 |

OTHER PUBLICATIONS

Machine Translation of JP 2006-057732, "Wheel Driving Device for a Vehicle" Toru Kamiya, Mar. 2, 2006.*

International Search Report for PCT/IB2010/001193 mailed Aug. 23, 2010.

* cited by examiner

WHEEL MOTOR WITH ROTATING OUTER ROTOR

CROSS-REFERENCE TO RELATED APPLICATION

The present application claims priority under 35 U.S.C. §119(d) to a corresponding patent application filed in India and having application number 1226/CHE/2009, filed on May 27, 2009, the entire contents of which are herein incorporated by reference.

BACKGROUND

Due to continued increases in the price of petroleum-based fuels, and concerns about by-products of burning petroleum-based fuels, electric and hybrid cars have become more popular with purchasers and more economical as well.

An electric car is a type of alternative fuel vehicle that utilizes an electric motor and motor controller instead of an internal combustion engine. A hybrid car is a type of alternative fuel car that includes both an electric motor or motors and an internal combustion engine. Currently, in most cases, electrical power is stored and derived from battery packs carried on board the vehicle. Fuel cells are also being used to power electrical motors.

In a pure electric vehicle, with no corresponding internal combustion engine, an electric engine replaces the internal combustion engine, providing a central power plant to provide power to a mechanical distribution system (a transmission) that then transfers the power to disparately placed wheels.

A similar system is used in hybrid vehicles, with the exception that both an electric motor and an internal combustion motor (albeit smaller than an internal combustion motor for an internal combustion-only vehicle) work together to perform the function of the traditional internal combustion motor. As in the case of the pure electric vehicle, a mechanical distribution system is utilized to transfer power from the centralized motor compartment to the disparate positions of the wheels.

In a conventional electric motor centralized at an engine compartment, the outer casing (the stator) is stationary while a rotating portion inside the stator (the rotor) rotates to generate mechanical energy. The transmission of the mechanical energy from the electrical engine in the centrally placed engine compartment of the vehicle to remote load locations at the wheels introduces losses into the system that reduce the efficiency of the electrical vehicle, and thereby decreases the overall range of an electrical vehicle.

Accordingly, advances in electric vehicle design are needed to further improve energy efficiency and reduce manufacturing and/or total ownership costs so as to increase the availability of electric and hybrid vehicles to consumers around the world.

SUMMARY

Disclosed herein is an in-wheel motor comprising an inner stationary stator including a plurality of magnets having windings, the magnets arranged at an outer circumference of the stator, an outer rotor surrounding the inner stator and including a plurality of magnets arranged at a circumference of the rotor, and a bearing layer positioned radially between the stator and the rotor for allowing rotational movement of the rotor relative to the stator, and for distributing forces applied to the outer rotor. A plurality of switches may be arranged correspondingly to the plurality of windings, and a controller may be disposed for applying a switching pattern to the switches to cause the rotor to rotate in a first or second axial direction.

A speed of the rotor may be controlled by varying a frequency of the switching pattern, and a torque of the rotor may be controlled by varying a pulse width of the switching pattern. An encoder may be attached to the rotor to determine a current position of the magnets on the rotor relative to the windings of the stator to aid in determining a proper switching pattern to apply to the switches.

The bearing layer may be comprised of bearings. In one example, the bearings could be a plurality of rolling ball-bearings.

The disclosed in-wheel motor could be used as a wheel on a train so as to cause the rotor to rotate over a metal rail. Alternately, a rubber tire may be attached to an outer circumference of the rotor to allow the wheel to be used on a roadway material such as pavement or cement.

Also disclosed herein is an in-wheel motor having an inner stationary stator including a plurality of magnets including windings, the magnets arranged at an outer circumference of the stator, an inner support ring coupled to the magnets and extending in a direction parallel to a central axis of the in-wheel motor away from the magnets, an outer rotor surrounding the inner stator and including a plurality of magnets arranged at a circumference of the stator, a rotor projection portion extending in the direction parallel to the central axis of the in-wheel motor so as to surround the inner support ring; and a bearing layer positioned radially between the inner support ring of the stator and the projection portion of the rotor allowing rotational movement of the rotor relative to the stator, and for distributing forces applied to the outer rotor.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
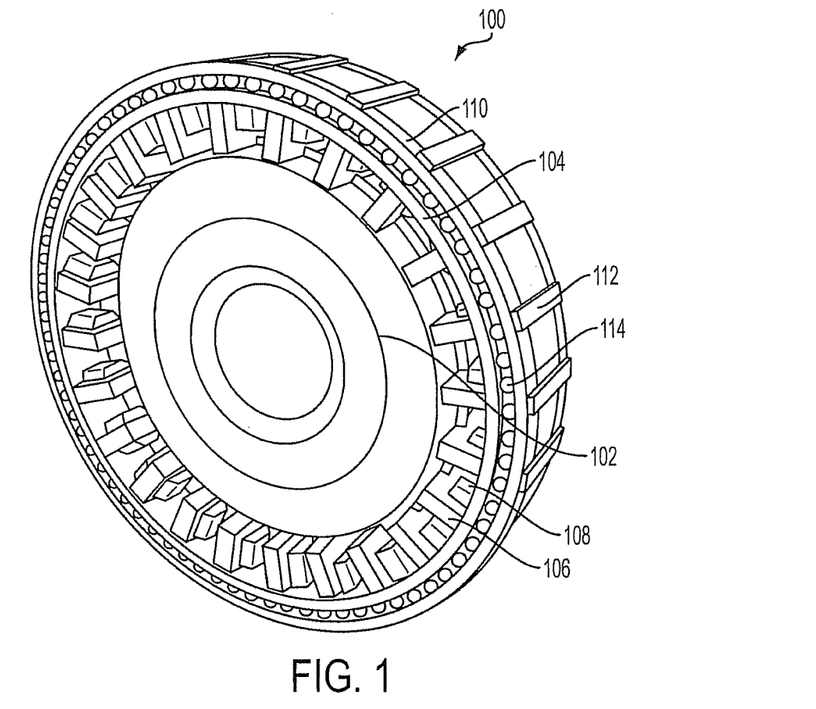
FIG. 1 is a perspective view of an in-wheel motor according to one embodiment.
Figure 6:
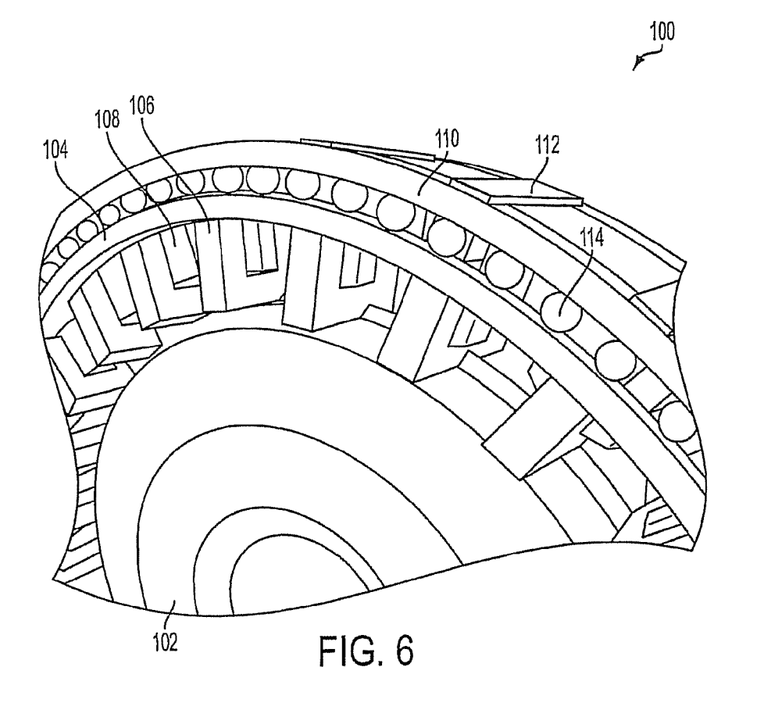
FIG. 6 is a perspective view of an in-wheel motor having rolling bearing elements between the rotor and the stator according to an embodiment.

FIG. 1 sets forth an illustrative in-wheel motor 100. The in-wheel motor 100 is comprised of two main components, a stationary stator 104 and a rotor 110. The rotor 110 is positioned around the circumference of the stator 104 such that it is capable of rotation around the stator 104. The stationary stator 104 is formed around the outer circumference of a circular mechanical support element 102. A plurality of electromagnets 106 are positioned along an outer circumference of the stator 104. The rotating rotor 110 circumferentially surrounding the stator 104 includes a number of magnets 112. A bearing 114, as discussed in more detail in regard to FIG. 6, is formed between the rotor 110 and the stator 104 to support the axial rotation of the rotor 110 relative to the stator 104. As discussed in more detail below, the electromagnets 106 of the stator 104 can be energized in a controlled fashion to drive rotation of the magnetic rotor 110.

The mechanical support element 102 could be formed in the shape of a ring, as shown in FIG. 1. Alternately, any shape could be used, including, for example, a hub-and-spoke shape in which the stator 104 is supported by spokes connecting to a central hub. The mechanical support element 102 may be formed of any rigid material that would provide sufficient rigidity to support the weight of a vehicle. For example, a composite, a solid metal, or a metal alloy material could be used. Alternatively, a rigid plastic material could be used, or a heterogeneous mix of any two or more materials. Other examples are possible as well.

A plurality of electromagnets 106 are placed along an outer circumference of the mechanical support 102 and stator 104. Although FIG. 1 shows a large number of electromagnets 106 along the outer circumference of the support 102, any number of electromagnets 106 generally greater than two could be used depending on the particular application, including the desired speed and torque for the application.

Figure 2:
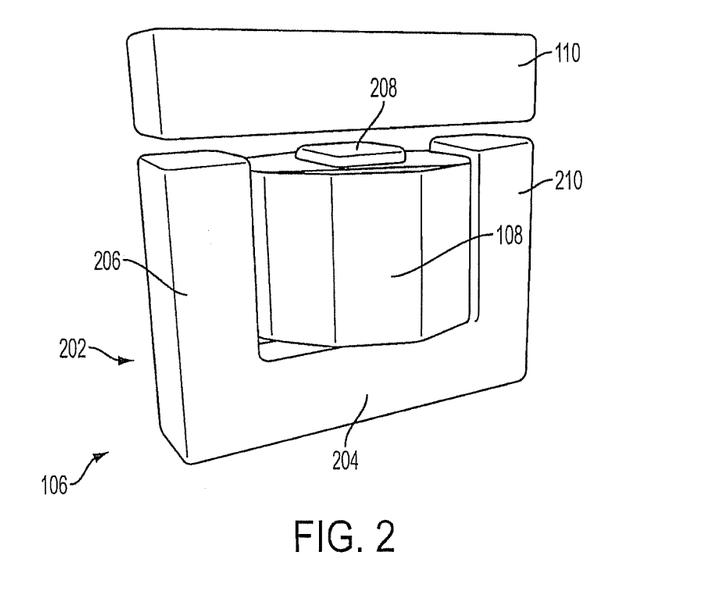
FIG. 2 is a perspective view of a winding according to one embodiment.

FIG. 2 sets forth a more detailed view of the electromagnets 106. In this embodiment, each electromagnet 106 is comprised of an E-shaped core 202 having a base 204 and a first outer finger 206 and second outer finger 210 extending perpendicularly from the base 204. A third central finger 208 is formed between the two other fingers also extending perpendicularly from the base 204. A winding 108 may be formed around the central finger 208 and connected to a switch (not shown) for supplying power to the winding 108. The electromagnet 106, when energized, imparts an electromagnetic force on the rotor 110, which is spaced apart from the electromagnet 106, as described in more detail in the embodiments below.

In other example embodiments, different shaped electromagnetic cores could also be used, including, for example, a bar-shaped, an F-shaped, or a C-shaped core. An advantage of the E-core is that it provides substantial room to bring in high current lead wires, and provides good heat dissipation. The E-shaped core 202 could be formed of an iron alloy, a cobalt alloy, ferrite, or any other suitable material. While FIG. 2 illustrates equally-sized fingers 206-210, one or more of the fingers 206-210 may differ in width and/or length.

Returning to FIG. 1, the in-wheel motor 100 comprises the rotor 110 circumferentially surrounding the stator 104. As previously mentioned above, the rotor 110 includes a plurality of periodically placed magnets 112. The magnets 112 interact with the magnetic flux created by the stationary electromagnets 106 of the stator 104 to impart torque on the magnets of the rotor 110 and cause the rotor 110 to rotate in one of a clockwise or counter-clockwise direction relative to the stator 104. The magnets 112 may be, for example, permanent magnets formed of a ferromagnetic material, including iron, cobalt or nickel. Alternatively, or additionally, the magnets 112 could be rare-earth magnets such as samarium-cobalt or neodymium-iron-boron. Other appropriate materials could also be used. While FIG. 1 illustrates an in-wheel motor 100 having an equal number of electromagnets 106 and magnets 112 with each pair aligned in a radial direction, such an arrangement is not necessary. In another embodiment the number of electromagnets 106 could be unequal to the number of magnets 112, and spaced in such a way that at least some of the magnets 112 are always un-aligned with some of the electromagnets 106, in order to avoid potential starting problems.

Figure 3:
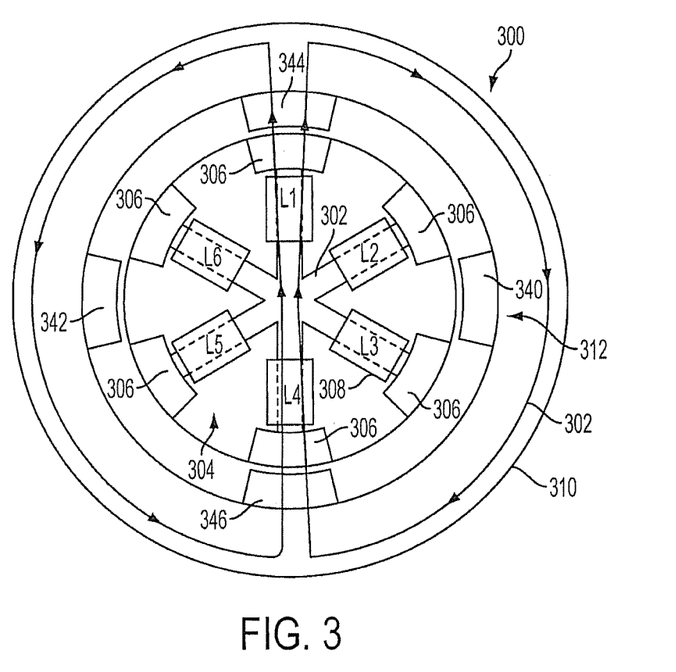
FIG. 3 is a diagrammatic side-view of an embodiment of an in-wheel motor showing a magnetic flux field created by passing current through a winding.

FIG. 3 illustrates a magnetic flux field 302 generated by the electromagnets 306 in an example embodiment of an in-wheel motor 300. For the purpose of illustration and discussion, the rotor 310 of the in-wheel motor 300 is shown to contain four poles corresponding to the four magnets 340, 342, 344, and 346. The rotor 310 magnetically couples the four poles so that there will be flux linkage for the magnetic flux generated by the windings L1-L6. The stator 304 contains six poles corresponding to the six windings L1-L6 formed at an outer circumference of a mechanical support 302. FIG. 3 illustrates the magnetic flux 302 created when windings 1 and 4 of FIG. 3 are switched on. As can be seen from the figure, the magnetic flux field 302 travels radially outward from the winding L1 towards the rotor and then proceeds circumferentially around the rotor 310 to the winding L4 on the opposite side of the stator 304. FIG. 3 is one non-limiting example configuration.

Figure 4:
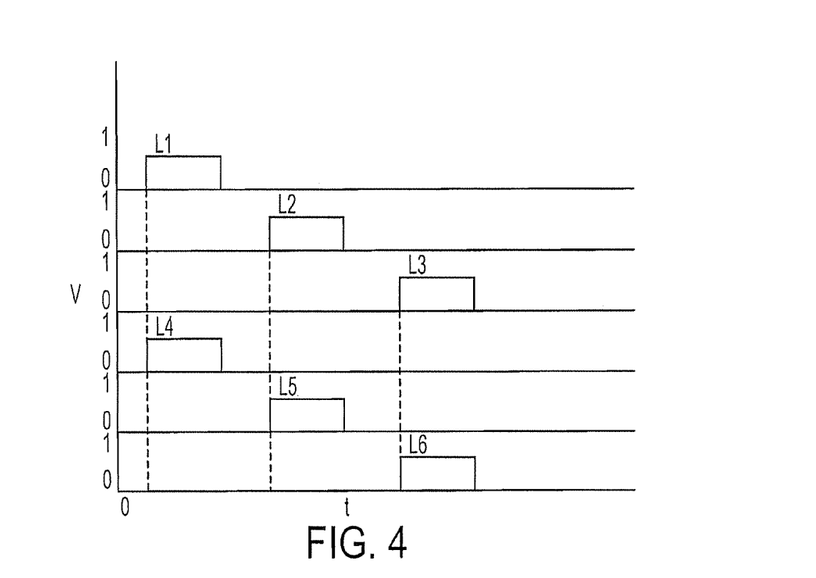
FIG. 4 is a timing diagram setting forth an example method of driving windings of a stator of an in-wheel motor.
Figure 5:
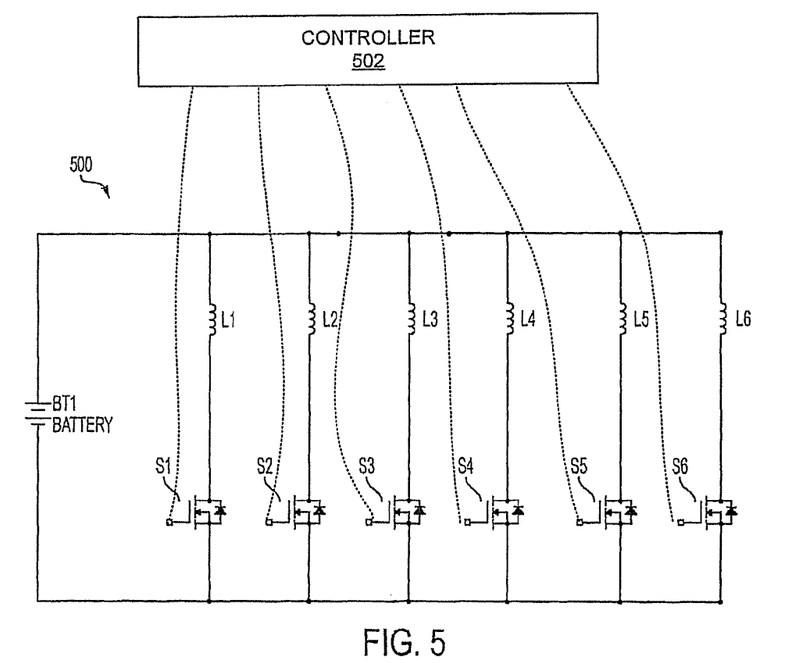
FIG. 5 is an example circuit diagram for producing drive signals to drive the windings of a stator of an in-wheel motor.

FIGS. 3-5 illustrate the driving means for driving the electromagnets 306 to cause the rotor 310 to rotate relative to the stator 304. As shown in the circuit 500 of FIG. 5, each winding L1-L6 of FIG. 3 is controlled via a corresponding switch S1-S6. Although FIG. 5 illustrates a one-to-one correspondence between the switches S1-S6 and the windings L1-L6, such a relationship is not required, and a single switch S1 may provide power to more than one winding L1-L6.

As set forth in FIG. 5, a control circuit 502, such as a microcontroller, may be used to drive the switches S1-S6 in a particular pattern. Alternately, a custom designed ASIC, FPGA, or other device could also be used to control the switching pattern of the circuit The switches S1-S6 may be insulated gate bipolar transistors (IGBTs) or metal-oxide-semiconductor field-effect transistors (MOSFETs). Other switching devices could also be used.

FIG. 4 illustrates an example timing diagram for the switches S1-S6 to drive the windings L1-L6 of FIGS. 3 and 5. As shown in FIG. 4, switches S1 and S4 can be turned on substantially simultaneously in a first time period to energize windings L1 and L4. Similarly, switches S2 and S5 can be energized substantially simultaneously in a second time period to energize windings L2 and L5. Finally, switches S3 and S6 can be energized substantially simultaneously in a third period to energize windings L3 and L6. This switching pattern can be repeatedly sequenced a number of times to drive the rotor 310 to rotate continuously relative to the stator 304. Although FIG. 4 illustrates square-wave pulses in the timing diagram, any other shape pulse could also be used, including for example, a sinusoidal pulse or a triangular pulse.

Where the relative rotor 310 and stator 304 are in the positions shown in FIG. 3, energizing windings L3 and L6 will cause the rotor 310 to move in the counter clock-wise position as the electromagnets 306 associated with windings L3 and L6 repel against magnets 310 and 312, respectively. Alternately, given the same rotor 310 and stator 304 positions of FIG. 3, energizing windings L2 and L5 instead will cause the rotor 310 to move in the clockwise direction as the electromagnets 306 associated with windings L2 and L5 repel against magnets 310 and 312, respectively. In practice, an optical or mechanical encoder may be used to provide a position indication of the rotor 310 to the control circuit. The control circuit could use the position indication in determining the proper timing of pulses to provide to the windings L1-L6 to cause a desired clockwise or counter-clockwise movement of the rotor 310.

A braking operation can also be implemented to cause an already rotating rotor 310 to slow down and/or stop. For example, we can assume that the rotor 310 of in-wheel motor 300 is already moving in a clockwise direction, and that FIG. 3 shows a split second view of the relative rotor 310 and stator 304 positions. In this situation, the controller 502 can cause windings L6 and L3 of electromagnets 306 to be energized at the exact moment shown in FIG. 3. The energizing of windings L6 and L3 will cause the stator 304 to apply an electromagnet force against the magnets 342 and 340 in a rotational direction opposite the clockwise rotation of the rotor 310. The remaining windings L1, L2, L4, and L5 are driven in a similar manner as they approach corresponding magnets 340-346. The driving pattern can then be repeated for each cycle of the rotor 310 around the stator 304. This braking driving method will cause the rotor 310 to slow down and eventually stop. The amount of breaking will depend upon the pulse width of the switching pattern.

In an example embodiment, variation of the frequency of the pulses in the timing diagram of FIG. 4 can be used to control the rotational speed of the rotor 310. An increase in the frequency of the pulse trains applied to the windings 308 will cause a corresponding increase in speed of the rotor 310. The duty cycle of the pulse trains applied to the windings 308 can be varied to control the torque applied to the rotor 310. An increase in the duty cycle will cause a commensurate increase in the torque applied to the rotor 310.

FIG. 6 illustrates a close-up view of the bearing 114 between the rotor 110 and the stator 102. The bearing 114 allows relative axial rotation of the rotor 110 relative to the stator 102. The bearing 114 may be a solid ring-shaped rubbing surface that, along with a lubricating material, allows the rotor 110 to slide relative to the stator 102. Alternatively, and as shown in FIG. 6, the bearing 114 may be a rolling element bearing. Potential rolling element bearings include ball bearings, cylindrical roller bearings, tapered roller bearings, needle bearings, or spherical roller bearings. Other types of bearings can also be used, including, for example, liquid, gas, or magnetic bearings. FIG. 6 illustrates an embodiment utilizing ball bearings.

The bearing 114 can support a radial load applied to the bearings from a vehicle attached to the wheel motor, and can support a thrust load applied during vehicle cornering. In the case of rolling element bearings, the bearings may be made from steel or stainless steel. Depending on the weight requirements of the application and bearings, other compositions such as polymers or ceramics could also be used. A lubricant such as grease or oil may be provided to decrease an amount of friction generated in the bearing 114. Additionally, retainer rings or grooves may be provided on the rotor 110 or the stator 104 to maintain the bearings 114 in a proper position.

Figure 7:
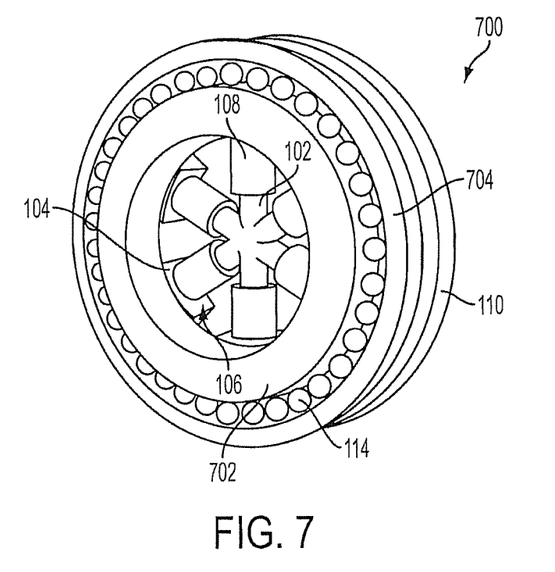
FIG. 7 is a perspective view of an alternative bearing arrangement according to an embodiment.
Figure 8:
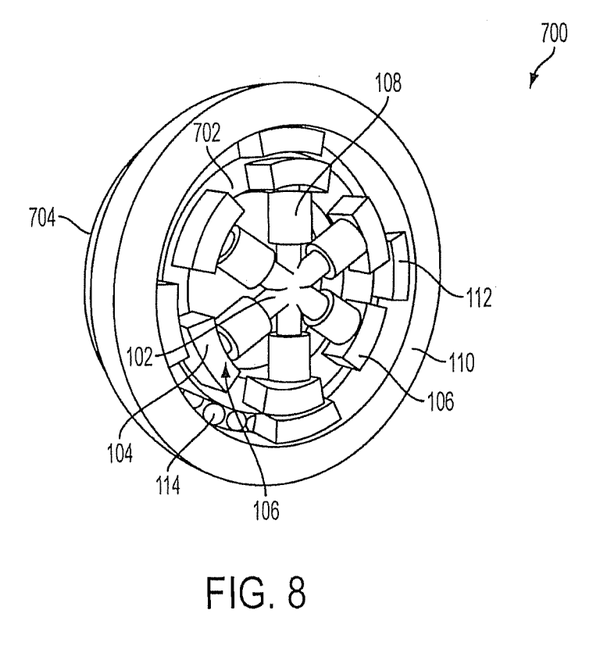
FIG. 8 is a reverse perspective view of the alterative bearing arrangement of FIG. 7.

FIGS. 7 and 8 illustrate another embodiment of an in-wheel motor 700. FIG. 7 provides a front-view, while FIG. 8 provides a rear-view of the same in-wheel motor 700. The in-wheel motor 700 includes a stator projection ring 702 that extends orthogonally from a plane defined by the mechanical support 102. As shown in FIG. 7, the stator projection ring 702 may be attached to portions of the stator 104. The rotor 110 further includes a rotor projection ring 704 that extends orthogonally from a plane defined by the rotor 110 and surrounds the stator projection ring 702. The in-wheel motor 700 includes a bearing 114 positioned between the stator projection ring 702 and the rotor projection ring 704. By slightly offsetting the bearing 114 from the gap directly between the rotor 110 and the stator 104, a bearing 114 can be utilized with reduced concerns about interfering with the magnetic interaction or coupling between the electromagnets 106 and the magnets 112.

Although not shown in the Figures, a tire may be attached directly to an outer surface of the rotor 110. The tire, for example, may be comprised of a rubber or rubber/composite compound, and may be inflated with air to maintain a particular tire pressure. The tire may include additional load-supporting sidewalls or plastic load-bearing inserts to allow the time to run safely for a limited range at a limited speed. In this embodiment, the rotor 110 may be formed so as to include flanges at outside edges of the outer surface that the tire may interface and bond width to secure the tire and rotor 110 together.

Alternately, although not shown, a cover may be provided circumferentially over the outside of the rotor 110 in order to protect the magnets 112. Any additional support structure may be provided between the rotor 110 and the cover, such as a solid support, a plurality of spokes, or any other structure that can support a large weight load such as a locomotive. An outer surface of the cover may then directly contact a metal rail in operation so that rotation of the rotor 110 causes a locomotive or similar vehicle to move in a forward or reverse direction. In such an embodiment, the wheel may include a profile and flange on an inside portion to facilitate maintaining the wheel on the rail. In other example embodiments the rotor 110 may employ an additional mechanical support to a circumferential rim upon which a tire can be mounted. For example, the in-wheel motor may be implemented within a hub from which spokes extend radially outward to a rim with appropriate flanges to mount a tire. The hub includes rotor magnets (see in FIG. 1 as 112) that are driven by the electromotive force of the stator magnets (see in FIG. 1 as 106). The stator can be implemented integral with as a center axle. Bearings such as see in FIG. 1 between the hub and the stator allow the hub to rotate around the stator.

Specifically, for example, a plurality of in-wheel motors 100 or 700 could be provided at predetermined vehicle locations. At rest, none of the switches S1-S6 are energized. An encoder provided on the wheel or coupled to the wheel provides a position indication of the electromagnets 106 relative to the magnets 112 to a controller 502. The controller 502 may then determine which electromagnets 106 are properly offset from corresponding magnets so as to avoid a driving deadlock situation. Once the controller 502 determines which electromagnets 106 to begin driving with, the controller 502 begins outputting a pulse pattern similar to that of FIG. 4. The pulse pattern is sequenced to avoid deadlock while causing rotation in a clockwise or counter-clockwise direction. The clockwise direction may correspond to a forward vehicle direction, while the counter-clockwise direction may correspond to a reverse vehicle direction, for example.

As noted earlier, a variation in the frequency of the switching pattern applied may be used to vary the speed of the rotor, while a variation in the pulse width of the switching pattern may be used to vary a torque applied to the rotor 110. The switching pattern may continue at one or more frequencies until a braking operation is implemented. In order to brake, the controller 502 will apply a braking switching pattern to the switches that will result in an electromagnet force applied to the magnets 112 in a rotational direction opposite the current rotational direction of the rotor. The braking switching pattern may continue until the rotor 110 reaches a desired speed, or until the rotor reaches a complete stop.

In this manner, an in-wheel motor 900 can be provided that directly drives an outer tire or cover, eliminating transmission losses from a centralized engine, decreasing the overall weight of the vehicle, and increasing a range of an electric vehicle incorporating the in-wheel motor. Additionally, during vehicle braking, the in-wheel motor can provide regenerative power to pump energy back to a storage battery for use during a subsequent acceleration, further increasing the range of the electric vehicle incorporating the in-wheel motor. This also increases space efficiency since no separate centralized space is required for the motor.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An in-wheel motor comprising:
    an inner stationary stator including a plurality of magnets comprised of a plurality of windings, the magnets arranged at an outer circumference thereof;
    an outer rotor surrounding the inner stationary stator and including a plurality of rotor magnets arranged circumferentially thereon;
    a bearing layer positioned between the inner stationary stator and the outer rotor and configured to allow rotational movement of the outer rotor relative to the inner stationary stator, and further configured to distribute forces applied to the outer rotor;
    a plurality of switches, each switch arranged correspondingly to a winding of the plurality of windings; and a controller configured to apply a switching pattern to the plurality of switches to cause the outer rotor to rotate, wherein the switching pattern comprises substantially simultaneously energizing of two opposite windings of the plurality of windings, wherein the two opposite windings are positioned on opposite sides of an axis about which the outer rotor is configured to rotate.

2. The in-wheel motor of claim 1, wherein the controller is configured to control a speed of the outer rotor by varying a frequency of the switching pattern, and wherein the controller is further configured to control a torque of the outer rotor by varying a pulse width of the switching pattern.

3. The in-wheel motor of claim 1, further comprising an encoder attached to the outer rotor and configured to determine a position of the magnets on the outer rotor relative to the windings of the inner stationary stator.

4. The in-wheel motor of claim 1, wherein the bearing layer comprises a plurality of rolling ball-bearings.

5. The in-wheel motor of claim 1, further comprising a tire directly attached to the outer rotor.

6. The in-wheel motor of claim 1, wherein the plurality of rotor magnets comprises permanent magnets.

7. The in-wheel motor of claim 1, wherein the plurality of rotor magnets comprises rare-earth magnetic materials.

8. The in-wheel motor of claim 1, wherein the number of rotor magnets of the plurality of rotor magnets on the outer rotor differs from the number of magnets of the plurality of magnets on the inner stationary stator.

9. The in-wheel motor of claim 1, wherein the plurality of magnets on the inner stationary stator comprises electromagnets.

10. The in-wheel motor of claim 1, wherein the plurality of magnets on the inner stationary stator comprises an E-shaped core.

11. The in-wheel motor of claim 10, wherein the E-shaped core comprises equal length fingers.

12. An in-wheel motor comprising:
an inner stationary stator including a plurality of magnets comprising a plurality of windings, the magnets arranged at an outer circumference thereof, and wherein the inner stationary stator further includes an inner support ring attached to the plurality of magnets and extending in a direction parallel to a central axis of the in-wheel motor away from the plurality of magnets;
an outer rotor surrounding the inner stationary stator and including a plurality of rotor magnets arranged circumferentially thereon, wherein the outer rotor further includes a rotor projection portion extending in the direction parallel to the central axis of the in-wheel motor so as to surround the inner support ring;
a bearing layer positioned radially between the inner support ring of the inner stationary stator and the rotor projection portion and allowing rotational movement of the outer rotor relative to the inner stationary stator, wherein the bearing layer is configured to distribute forces applied to the outer rotor;
a plurality of switches, each switch arranged correspondingly to a respective winding of the plurality of windings; and
a controller configured to apply a switching pattern to the plurality of switches to cause the outer rotor to rotate about an axis and around the inner stationary stator, wherein the switching pattern comprises substantially simultaneously energizing two opposite windings of the plurality of windings, and wherein the two opposite windings are positioned on opposite sides of the inner stationary stator and on opposite sides of the axis about which the outer rotor is configured to rotate.

13. The in-wheel motor of claim 12, wherein the controller is configured to control a speed of the outer rotor by varying a frequency of the switching pattern, and wherein the controller is further configured to control a torque of the outer rotor by varying a pulse width of the switching pattern.

14. The in-wheel motor of claim 12, further comprising an encoder attached to the outer rotor and configured to determine a position of the rotor magnets on the outer rotor relative to the windings of the inner stationary stator.

15. The in-wheel motor of claim 12, further comprising a tire directly attached to the outer rotor.

16. The in-wheel motor of claim 12, wherein the plurality of magnets comprises permanent magnets.

17. The in-wheel motor of claim 12, wherein the plurality of magnets comprises rare-earth magnetic materials.

18. The in-wheel motor of claim 12, wherein the plurality of magnets on the inner stationary stator comprises electromagnets.

19. The in-wheel motor of claim 4, wherein the ball bearings of the bearing layer are offset from a position directly between the plurality of magnets of the inner stationary stator and the plurality of rotor magnets of the outer rotor.

20. The in-wheel motor of claim 10, wherein at least one winding of the plurality of windings is wound about a central finger of the E-shaped core.

\* \* \* \* \*

UNITED STATES PATENT AND TRADEMARK OFFICE
CERTIFICATE OF CORRECTION

PATENT NO.          : 8,476,794 B2                                                                 Page 1 of 1
APPLICATION NO.     : 12/551065
DATED               : July 2, 2013
INVENTOR(S)         : Amutham It is certified that error appears in the above-identified patent and that said Letters Patent is hereby corrected as shown below:

In the Specification:

In Column 4, Lines 25-26, delete "mechanical support 302." and
insert -- mechanical support 312. --, therefor.

In Column 4, Line 45, delete "circuit The" and insert -- circuit. The --, therefor.

In Column 5, Line 1, delete "magnets 310 and 312," and
insert -- magnets 344 and 346, --, therefor.

In Column 5, Line 6, delete "magnets 310 and 312," and
insert -- magnets 344 and 346, --, therefor.

In Column 5, Line 41, delete "stator 102." and insert -- stator 104. --, therefor.

In Column 5, Line 43, delete "stator 102." and insert -- stator 104. --, therefor.

In Column 5, Line 45, delete "stator 102." and insert -- stator 104. --, therefor.

Signed and Sealed this
Twenty-ninth Day of October, 2013

Teresa Stanek Rea
*Deputy Director of the United States Patent and Trademark Office*